United States Patent Office 3,447,070
Patented May 27, 1969

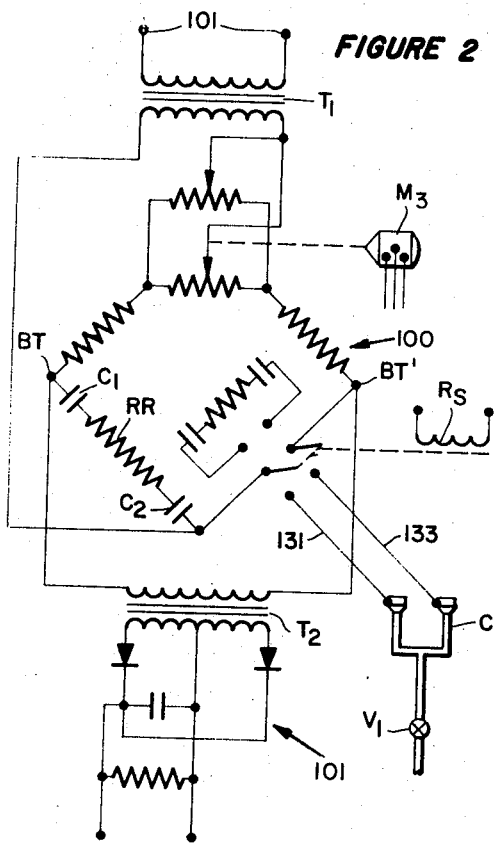
FIGURE 2
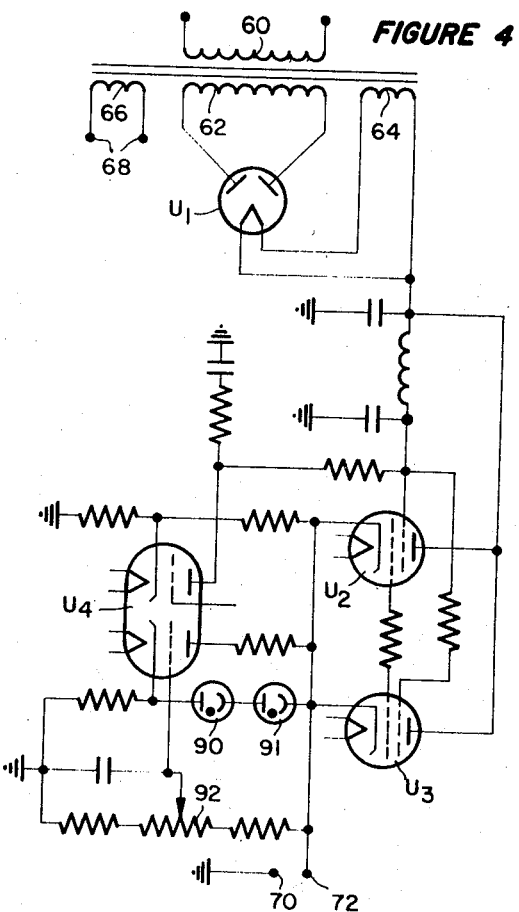
FIGURE 4
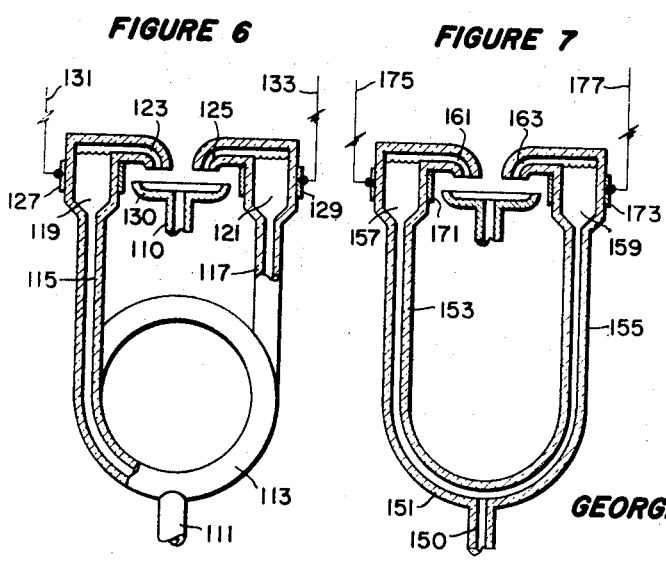
FIGURE 6
FIGURE 7
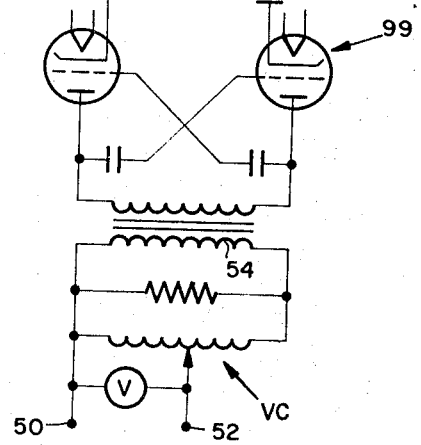
FIGURE 4A
MAX SAND
GEORGE J. CVEJANOVICH INVENTORS
BY Donald F. Ulphlus
PATENT ATTORNEY

3,447,070
APPARATUS FOR MEASURING THE ELECTRICAL CONDUCTIVITY OF CORROSIVE FLUIDS
Max Sand and George J. Cvejanovich, Aruba, Netherlands Antilles, assignors to Esso Research and Engineering Company, a corporation of Delaware
Filed Apr. 11, 1966, Ser. No. 541,697
Int. Cl. G01r *11/44, 27/02*
U.S. Cl. 324—30     3 Claims

ABSTRACT OF THE DISCLOSURE

Apparatus which allows the electrical conductivity of a corrosive fluid to be measured without placing instrument electrodes into direct contact with the fluid, thus avoiding electrode corrosion. The apparatus comprises a glass U-tube conductivity cell for the fluid to be tested, which tube forms a capacitance coupling with the material to be tested. Each arm of the U-tube is provided with an externally coated reservoir wherein the coating is of a conductive nature. A Wheatstone bridge is employed in a suitable measuring circuit and an alternating current of high frequency is employed to obtain reliable conductivity measurements in conjunction with the U-tube conductivity cell.

---

The present invention relates to apparatus for measuring the electrical conductivity of fluids. More specifically, it relates to a device for measuring the conductivity of either gases or liquids or mixtures thereof. The invention is particularly suited for measuring materials which are ordinarily corrosive to electrodes. The present invention is especially designed to measure the electrical conductivity of corrosive fluids, e.g. gases, vapors, etc. in which the measuring electrodes are external to the fluids being tested and are physically isolated therefrom.

Numerous proposals have been made in the past, and various instruments are in use, for testing the electrical conductivity of gases, vapors and liquids. By such means, the analyses of liquids and vapors, etc. may be facilitated. Devices of this type are often used in connection with gas chromatographs. They may also be installed in various plant streams, for automation, for example, where variations in a fluid composition passing through a line will produce corresponding variations in the electrical current conducted by the fluid. By means of suitable equipment, the changes may be indicated visually or graphically or may be recorded, as by printing, using suitable recording instruments.

One difficulty with instruments of this general type in the past has been that the conductivity had to be tested by means of contacts or electrodes in physical contact with the fluids. With materials which tend to be corrosive to the electrodes, erratic results are often obtained. If the electrodes which make the actual contact with the fluid stream being tested are appreciably corroded or become rusted, or if they otherwise become coated with materials which change their electrical conductivity per se, this obviously gives variations in readings at the instruments.

According to the present invention, it has been found possible to make conductivity measurements with all the accuracy required on even the most highly corrosive materials. This is done by passing a current through the fluid without actually having the electrode in contact therewith. By this means, the electrodes do not become corroded at all and the instruments therefore will continue to give accurate results for long periods of time.

According to the present invention, while the electrodes are kept out of actual physical contact with the material to be measured, they are coupled therewith by using an alternating current of suitable frequency. The separating body, such as a glass tube, serves both as container for a fluid and as the dieelectric element of the coupling capacitance. Thus the conductivity cell is coupled by a capicitance with the material to be tested, the electrode being kept external and entirely isolated from it. In this way, it becomes possible to make accurate measurements on viscous materials, materials where liquid particles are entrained, highly corrosive materials which otherwise would coat or foul the electrodes, etc. The apparatus of this invention obviously has use in other circumstances where, for any reason, it would be undesirable to have the electrodes exposed to or in contact with material under test. For example, in any case where the material of electrodes would react chemically with the material being tested, it would be undesirable to have actual physical contact. The present apparatus makes it possible to test such materials without need for such contact.

The invention will be more fully understood by reference to a preferred embodiment thereof, which is illustrated in the accompanying drawings and described in detail hereinafter. Referring now to the attached drawings which form a part of this specification:

FIGURE 2 is a diagram of the measuring cell and bridge circuit.

FIGURES 4 and 4A show respectively the stabilized power supply and the bridge supply circuits.

FIGURES 6 and 7 show test cells of alternative construction.

Figure 1:
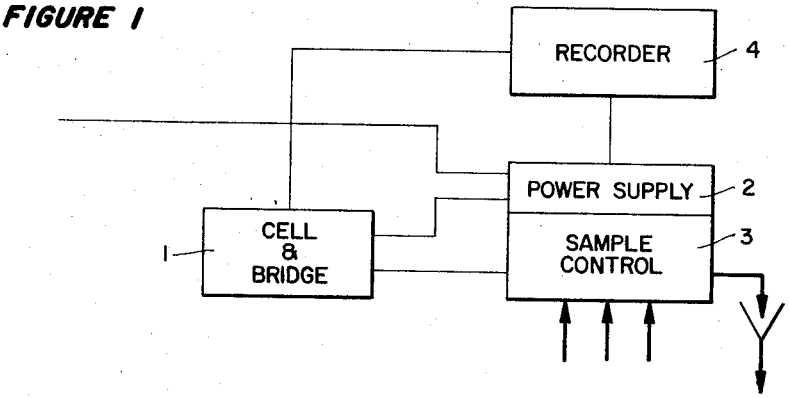
FIGURE 1 is a block diagrammatic view of the automatic conductivity recording apparatus.

The apparatus comprises the following several compartments:

(a) The measuring and bridge compartment 1.
(b) and (c) The power supply unit and the control and selector unit in a single compartment 2, 3.
(d) The recorder compartment 4.

Referring now to the drawings, an important part of the apparatus is the test cell *c*. See FIGURE 2. Cells of alternative constructions are shown in FIGURES 6 and 7. Both of them preferably are constructed of all Pyrex glass, although other materials may be used. Each of them includes a flow inlet tube 111 or 150 at the bottom, which is joined to a U-shaped capillary tube 113 or 151, respectively or to a coil including such a tube, at the lowest point of the U-bend. The capillary tube extends in both directions from this connection. To each end of the capillary, preferably at the highest points as they are set in the apparatus, a small reservoir or cell 119, 121, etc. is fitted, equipped with an overflow tube 123, 125, or 161, 163. To provide electric coupling to the material inside the reservoirs, so that conductivity of the fluid therein can be measured, the outside of each of these reservoirs is coated with a heavy deposit 127, 129, or 171 of conductive metal. This preferably is silver, applied in any suitable way, e.g. by electro-deposition, to the Pyrex glass.

To this metal layer the requisite electrical contact wires 131, 133, or 175, 177 are attached in any suitable manner, as by soldering. The cell is then preferably installed in a temperature controlled housing, such as that indicated at 1 in FIGURE 3. This is insulated to minimize thermal effects during measurements. The cell is then connected to electrical components as one leg of an alternating current bridge circuit 100, FIGURE 2, to which an appropriate alternating current potential is supplied from a source 101.

To reduce the coupling resistance created by the glass walls of the reservoirs, it is necessary to apply an alternating voltage of fairly high frequency. Preferably a frequency in the audio range is utilized, at least 100 cycles, preferably 1000 or higher. In most cases a frequency of 1000 cycles is about minimum, 2500 cycles is usually better. Frequencies of 5000 or more cycles per second can be used in some cases if desired.

By using a capacitative coupled capillary, such as those shown in FIGURES 6 and 7, in an alternating current bridge circuit of the type commonly used for measuring in instruments of this general character, satisfactory measurements can be made. Employing an elevated frequency gives very satisfactory results. This appears to be a distinct improvement over the practices of the prior art.

The Wheatstone bridge 100, shown in FIGURE 2 as employed in the measuring circuit, is a standard alternating current bridge of well known type. The supply voltage to the bridge is passed from an isolation transformer $T_1$ having a very low intercoil capacitance. Another isolation transformer $T_2$ preferably is used to separate the bridge output from the signal rectifier. The latter, in turn, feeds its output through a suitable resonant circuit 101 to a direct current millivolt recorder to show the result at the bridge.

Obviously, the bridge circuit, the frequency, and the supply voltage must be properly designed of components which are selected to obtain the desired operating range on the instrument. By increasing or decreasing the operating frequency of the bridge, for example, it is possible to change the range of concentrations that can be measured by the instrument. This makes a highly versatile instrument which can measure various types of materials. Alternatively, or simultaneously, the range of the measuring circuit can be changed also by changing the physical dimensions of the measuring capillary; that is, by increasing or decreasing its diameter and/or its length. Furthermore, cells C of different constants may be employed and cells with capillaries of almost any size and length may be installed in the instrument.

Figure 3:
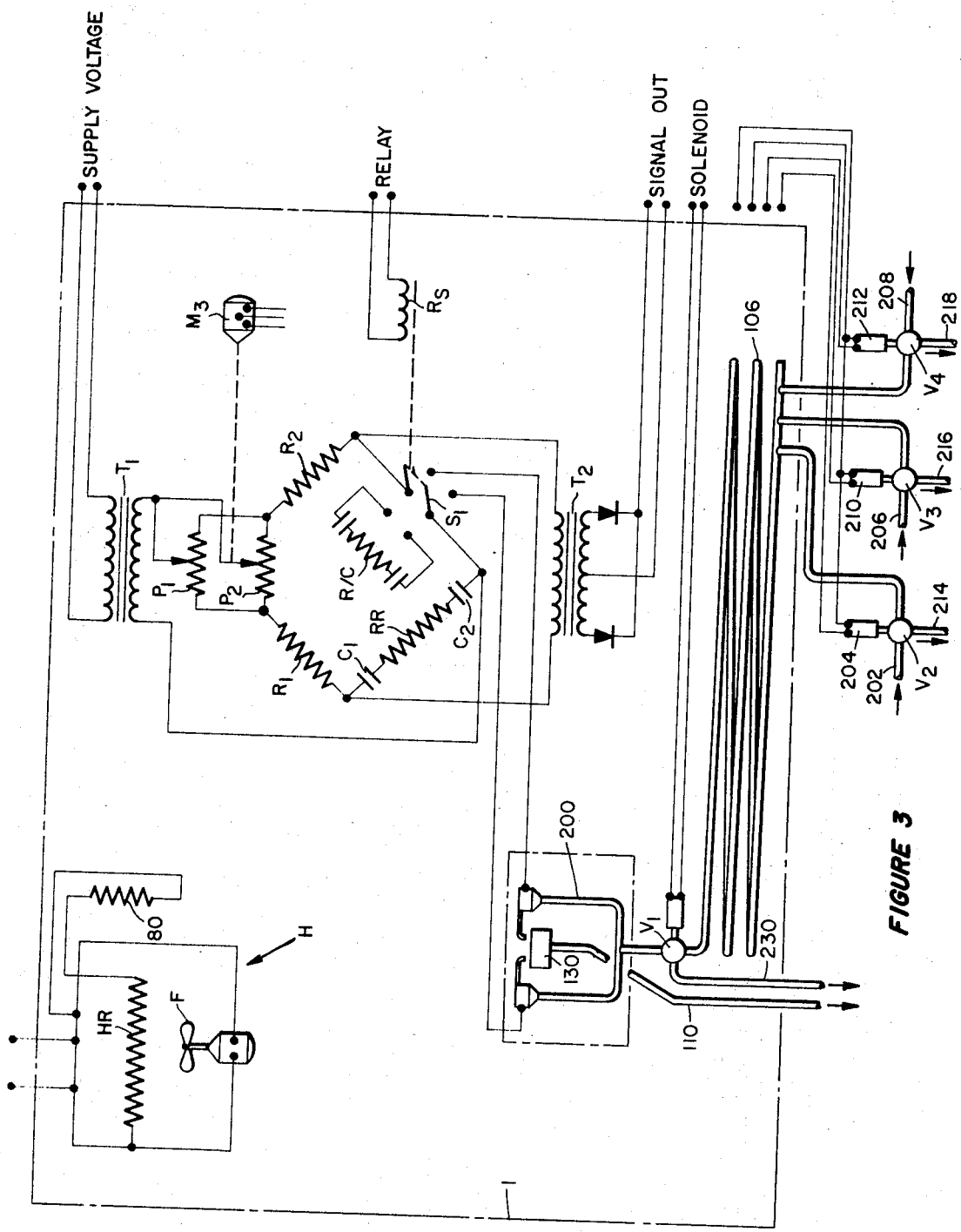
FIGURE 3 is a diagrammatic view of the cell and bridge compartment, showing the controls in greater detail.

When the device is installed, the bridge 100, FIGURE 2, is automatically grounded from the cell C through the inlet piping, by means of the conductive fluid therein, to the surrounding ground potential. For this reason, the flow of fluid through the capillary must be interrupted during the measuring cycle, since the effluent otherwise would electrically ground the upper section of the cell C via the conductive path of the fluid. This would produce the equivalent of a short circuit to the bridge circuit. A suitable valve $V_1$ is provided as shown in FIGURE 3. This is employed for the purpose of interrupting and restarting the flow of sample material.

The Wheatstone bridge 100 comprises legs $R_1$, $R_2$ and zeroing devices, both manual and automatic. The manual zeroing device comprises a potentiometer $P_1$ connecting $R_1$ and $R_2$ and having its pointer connected to one side of the secondary of transformer $T_1$. The auto-zero device comprises another potentiometer $P_2$, similarly connected but with its pointer operated by a motor $M_3$. The latter is controlled by a slide-wire balancing motor (not shown) in the recorder. Motor $M_3$ is connected mechanically to potentiometer $P_2$ through a clutch of suitable design.

A reference or substitute standard resistance device $R/C$ is mounted with the bridge so that a double pole double throw switch $S_1$ can connect it into the bridge circuit, in one position, or connect the cell into the circuit. This switch is moved from one position to another by means of a relay $R_s$. This assembly constitutes the third leg of the bridge. The fourth is composed of capacitors $C_1$ and $C_2$ plus a reference resistor RR, FIGURE 2.

The opposite bridge terminals BT and BT' are connected to the primary of output transformer $T_2$. The secondary winding of this low capacitance transformer connects to the recorder, thus supplying signals from the bridge to the recorder.

During the zeroing cycle a relay switches the recorder amplifier output from the slide-wire motor (not shown but mentioned above) to the auto-zero balancing motor $M_3$. The bridge circuit is carefully designed so that capacitive leakage will not interfere with the accuracy of the measuring device.

The reference leg $R/C$ is so designed that it balances the capacitance $C_1$, $C_2$. In other words, the capacitance $C_1$, $C_2$ corresponds to the zero adjusted capacitance of the measuring cell. The leg $R/C$ gives a check on the setting of the instrument before a sample is passed through the cell.

Experimentally it has been found that at a frequency of about 2500 cycles per second and a voltage of about 100 volts AC the range of the instrument is excellent. A broad range of from 0 to about 600 parts per million of a given ingredient may be detected. This applies, for example, to basic materials that can be expressed as sodium hydroxides. On the other hand, at a frequency of 1000 cycles per second, the range for the same ingredients is reduced in breadth to about 0 to 100 parts per million. For many purposes, however, this is adequate.

To obtain consistent results in the instrument, a stable voltage should be supplied to transformer $T_1$. Such a stabilized voltage can be obtained from any suitable source. It is preferably set at the desired level and maintained there by means of a suitable conventional controller such as a Variac VC, FIGURE 4A. In addition, the frequency of the power supply should be maintained very close to a constant value. For example, variations in frequency should be limited desirably within plus or minus 10 cycles per second, or preferably even less, of the desired basic level. A schematic drawing of satisfactory power supply and oscillator circuit is shown in FIGURES 4 and 4A.

Power is supplied to terminals 50, 52, FIGURE 4A, at about 100 volts and the desired frequency, say 1000 to 2500 cycles per second. Using 1000 cycles as an example (the voltage can be adjusted from 0 to 100 by means of Variac VC) any desired voltage can be supplied to the primary winding 54.

The DC power supply, FIGURE 4, takes ordinary 110 AC to a transformer primary 60 and the secondary 62 supplies a vacuum tube $V_1$, while a supplemental secondary 64 winding supplies filament current. Another supplemental secondary winding 66 supplies filament current to vacuum tubes $U_2$, $U_3$ and rectifier $U_4$ from terminals 68. (Connections are omitted in the interest of simplicity.) By use of gas discharge tubes 90, 91 and by suitable adjustment of potentiometer 92 a highly stable DC voltage, say 300 volts, is obtained at terminals 70, 72. This voltage is maintained constant over a fairly wide range of current value, e.g. from 5 to 150 milliamperes. Oscillator 99, FIGURE 4A, provides the alternating current at the desired frequency.

The arrangement described above measures a single cell at a time. Other cells can be connected into the circuit. If they vary in capacitance, etc., a different standard $R/C$ may be used.

FIGURE 3 shows additional wiring and valving details. These include a space heater H which comprises an electrical resistance heater HR and a motor driven fan F, controlled by a thermostat 80. The heater assembly maintains a constant temperature within the measuring cell and bridge compartment.

A cell 200 is shown connected in the third leg of the bridge 100 through leads 102, 104. Through valve $V_1$ a sample from the coiled (and hence temperature conditioned) tube 106 is taken, its resistance is measured in cell 200, and then the sample is discarded through drain 110. Samples from different sources are readily measured by feeding them through the temperature conditioning coil and into the cell 200. Solenoid operated valves are provided for this purpose. Thus from a source 202 a sample may be drawn through valve $V_2$ operated by solenoid 204. Similarly, other samples may be brought in through valves $V_3$ and $V_4$ from sources 206, 208, the valves being operated respectively by solenoids 210, 212. By suitable valve manipulation and use of 3-way valves, tested sample materials may be drained at 214, 216 or 218, as desired.

This instrument also can be readily adapted to multi-stream analysis by appropriate selection of solenoid valves, timers and switching devices. A suggested arrangement is shown in FIGURE 5.

Figure 5:
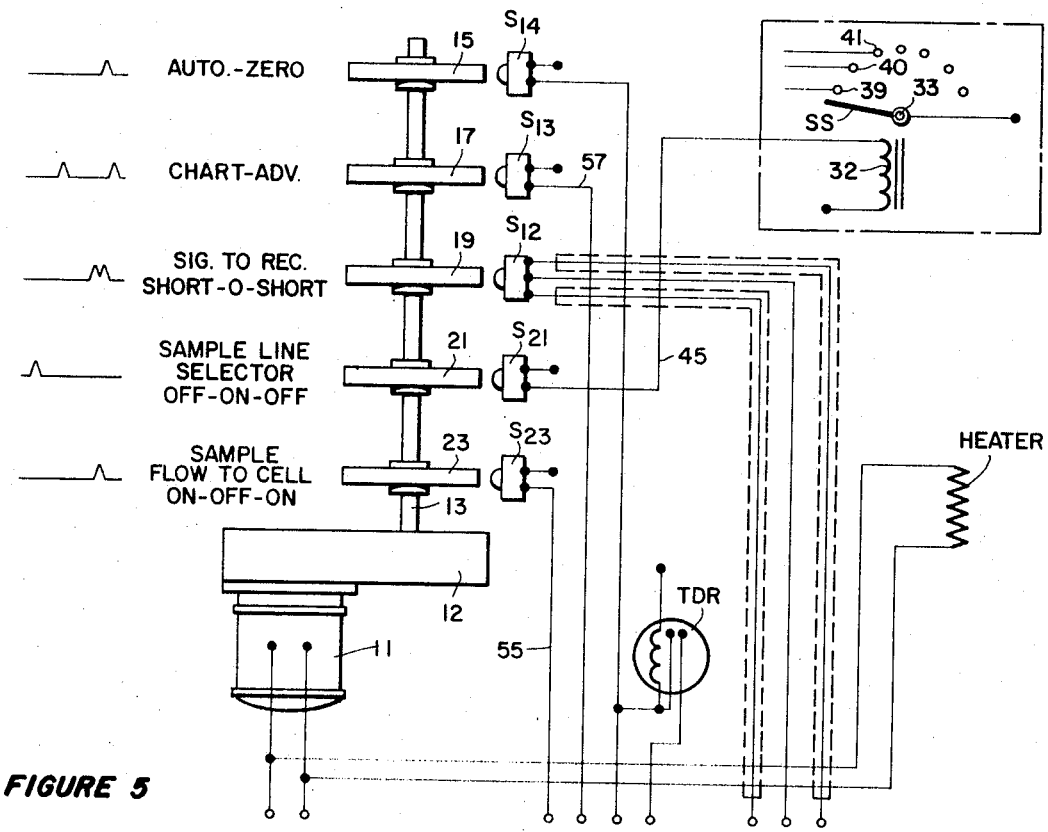
FIGURE 5 shows a cam controlled sample selection unit.

Referring now to FIGURE 5 a synchronous motor 11 is driven from any suitable source of power, e.g. 110 volt AC means, and is geared down by drive means 12 to a rotatable shaft 13. The latter carries a set of rotating cams 15, 17, 19, 21, and 23. In a typical case the shaft 13 rotates one turn in about fifteen minutes. These cams are adapated to open and close their circuits in a predetermined sequence and in an obvious manner. They operate respectively, the auto-zero relay, the chart advance mechanism, the recorder, a stepping switch SS, and the bridge or sample cell circuit.

The stepping switch SS is of conventional type and includes an operating solenoid 32. A shaft 33 which supports switch SS may also bear other rotatable contactors. The solenoid 32 is connected to a suitable source of power and services to rotate the shaft 33 and switch 31 one step each time it is actuated. A pawl and ratchet device may be employed for this purpose, if desired, or any other suitable stepping means, of which several are well known in the art.

When the cam 21 closes the circuit to the stepping switch SS the switch is advanced one step and the contact arm moves to the next respective contact, e.g. to 39, and later to 40, 41, etc., to establish a new circuit. This operation is repeated as often as a circuit is closed by the cam, through a switch $S_{21}$ connected to the appropriate line 45. It will be understood that the various cams 15, 19, 21, and 23 on the shaft 13 operate suitable electric contacts, preferably microswitches.

Assuming that each cam operates one switch, each is designed to make and maintain electrical contact of the required duration and then break it. The stepping switch SS will operate the appropriate solenoid to cause the desired sample material to flow through the coil and into the test cell 200. The desired stream is controlled through the appropriate stepping switch contact causing the appropriate valves to open and close.

The automatic zeroing of the instrument is brought into play by cam 15. Connection is made to the bridge circuit by cam 23 through $S_{23}$ by means of line 55. At the appropriate time, the chart paper on the recorder is advanced by suitable drive means well known in the art, being controlled through line 57. At the end of the recording operation, the instrument is brought back to zero and, if necessary, is calibrated by substituting the $R/C$ leg of the bridge for the cell by means of relay $R_z$.

Referring next to FIGURES 6 and 7, capacitive coupled conductive cells are shown which are adapted respectively to measure high concentration and low concentration. FIGURE 6 shows a high concentration cell wherein the material to be tested is brought into a capillary tube by a line 111 connected to the bottom of the coil 113 which constitutes part of the capillary. The coil consists of a glass capillary tube formed with as many turns as necessary to obtain the proper conductivity range in the material under test. The capillary includes terminal arms 115 and 117 extending upwardly from the coil.

At their upper ends, each of these terminals has a small reservoir 119 and 121, as previously described. Each of them has an overflow outlet indicated at 123 and 125, respectively. Each of them also is surrounded with a fairly thick coating of electroplated silver, indicated at 127 and 129, respectively. The latter is connected to electrical leads 131 and 133, respectively, by a soldered connection. A pan 130 is provided to catch liquid overflowing from the capillary. A suitable drain line 110 is provided, as mentioned above.

The cell of FIGURE 7 is generally similar to that of FIGURE 6 except that the coil at the bottom is replaced by a simple U bend 151. Inlet line 150 connects at the lowest point of the U bend and the respective arms 153 and 155 extend upwardly, being terminated by the small reservoirs 157 and 159, similar to those of FIGURE 6. Each reservoir has its outlet line 161, 163, from which an overflow may pass into overflow pan 167 to receive and take care of surplus fluid when there is an excess supplied. As in the previous case, the reservoirs 157 and 159 are each coated externally with a thick coating of conductive material, preferably silver, indicated at 171, 173. Electrical wires 175, 177 are connected, respectively, to these silver coatings by soldering or equivalent.

To summarize briefly, the fluid to be tested, whether gaseous, vaporous, or liquid, or a combination, is passed upwardly through the inlet line into the capillary tube. It flows upwardly through both branches to fill them and a small excess may be fed to overflow. A small body of the fluid then is contained in the reservoir at the top of each capillary leg. Alternating current of audio frequency range, e.g. 1000 to 2500 cycles, is applied to the silver coating on the outside of the reservoir. This current is effectively transmitted through the glass which, in effect, comprises a condenser dielectric, to the fluid inside. The resistivity of this fluid determines the amount of current that will flow through the capillary from one reservoir to the other. Flow is cut off below the capillary by the isolation valve $V_1$ shown in FIGURE 3. Liquid below this valve is removed through drain line 230. The length of the conductive path in any cell may be varied as desired, as is shown by comparing FIGURES 6 and 7. Also, its cross-section may be varied by changing the internal diameter of the capillary so that any desired conductivity range within reason may be obtained by appropriate design of the capillary tube. Tubes or cells of different lengths and having other characteristics are interchangeable. Hence, as large a number and variety of them as is useful may be provided so as to make the instrument as versatile as is desired.

What is claimed is:

1. An instrument for measuring the electrical conductivity of a corrosive fluid without directly contacting said fluid with electrodes, which instrument comprises in combination a Wheatstone bridge, means for balancing said bridge, means for applying an electrical alternating voltage of controlled radio frequency to said bridge, a conductivity cell of dielectric material, said conductivity cell having a U-like configuration, a first reservoir and a second reservoir affixed to the distal ends of said U-like cell, ungrounded electrically conductive material surrounding and externally affixed to said reservoirs, means for passing alternating currents from said bridge to said electrically conductive material surrounding said reservoirs and means for measuring the amount of current flowing through said conductivity cell.

2. Apparatus according to claim 1 in which electrical unbalance means at the bridge due to current flowing in the fluid are provided, and including means for recording said unbalance.

3. The apparatus of claim 2 wherein fluid supply means are connected to said U-tube at a point intermediate said first and second reservoirs and electrically insulating flow control means are provided on said fluid supply means.

References Cited

UNITED STATES PATENTS

| | | | |
|---|---|---|---|
| 993,586 | 5/1911 | Digby et al. | 324—30 |
| 1,341,790 | 6/1920 | Edelman | 324—30 X |
| 2,122,363 | 6/1938 | Christie | 324—30 |
| 2,769,141 | 10/1956 | Richardson | 324—30 |
| 3,147,431 | 9/1964 | Bennett et al. | 324—30 X |
| 3,320,529 | 5/1967 | Vreeland et al. | 324—30 |

FOREIGN PATENTS

| | | |
|---|---|---|
| 860,917 | 2/1961 | Great Britain. |
| 936,045 | 9/1963 | Great Britain. |

RUDOLPH V. ROLINEC, *Primary Examiner.*

C. F. ROBERTS, *Assistant Examiner.*

U.S. Cl. X.R.

324—65